US010627542B2

United States Patent
Singh et al.

(10) Patent No.: US 10,627,542 B2
(45) Date of Patent: Apr. 21, 2020

(54) HYBRID APPROACH TO ASSISTED HISTORY MATCHING IN LARGE RESERVOIRS

(71) Applicant: Landmark Graphics Corporation, Houston, TX (US)

(72) Inventors: Ajay Pratap Singh, Houston, TX (US); Seyed M Mirzadeh, Houston, TX (US); Marko Maucec, Englewood, CO (US); Gustavo Carvajal, Houston, TX (US); Steven Patton Knabe, Houston, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 722 days.

(21) Appl. No.: 14/899,680

(22) PCT Filed: Aug. 16, 2013

(86) PCT No.: PCT/US2013/055463
§ 371 (c)(1),
(2) Date: Dec. 18, 2015

(87) PCT Pub. No.: WO2015/002660
PCT Pub. Date: Jan. 8, 2015

(65) Prior Publication Data
US 2016/0131801 A1 May 12, 2016

Related U.S. Application Data

(60) Provisional application No. 61/843,108, filed on Jul. 5, 2013.

(51) Int. Cl.
*G01V 1/40* (2006.01)
*G01V 99/00* (2009.01)

(52) U.S. Cl.
CPC ................... *G01V 99/005* (2013.01)

(58) Field of Classification Search
CPC ...... G01V 99/00; G01V 1/282; G01V 99/005; G06F 17/00
See application file for complete search history.

(56) References Cited

U.S. PATENT DOCUMENTS

| | | | |
|---|---|---|---|
| 9,703,006 B2 * | 7/2017 | Stern | G01V 11/00 |
| 9,879,530 B2 * | 1/2018 | LopezGarcia | E21B 49/087 |
| 2007/0016389 A1 | 1/2007 | Ozgen | |
| 2008/0077371 A1 | 3/2008 | Yeten et al. | |
| 2008/0234939 A1 * | 9/2008 | Foot | E21B 43/00 |
| | | | 702/12 |
| 2008/0319726 A1 | 12/2008 | Berge et al. | |
| 2010/0206559 A1 * | 8/2010 | Sequeira, Jr. | E21B 41/00 |
| | | | 166/250.15 |
| 2012/0179438 A1 * | 7/2012 | Priestley | G06F 17/11 |
| | | | 703/2 |

(Continued)

OTHER PUBLICATIONS

International Search Report and Written Opinion; PCT Application No. PCT/US2013/045958; dated Jan. 9, 2014.

*Primary Examiner* — Aditya S Bhat
(74) *Attorney, Agent, or Firm* — Polsinelli PC

(57) ABSTRACT

Systems and methods for a hybrid approach to assisted history matching in large reservoirs based on a reservoir model built using connectivity between each production well and each corresponding injection well, aquifer or gas cap.

20 Claims, 8 Drawing Sheets

(56) References Cited

U.S. PATENT DOCUMENTS

| | | | |
|---|---|---|---|
| 2012/0253770 A1* | 10/2012 | Stern | G01V 11/00 |
| | | | 703/10 |
| 2013/0311158 A1* | 11/2013 | Dasari | G01V 99/005 |
| | | | 703/10 |
| 2014/0039793 A1* | 2/2014 | Querales | E21B 43/122 |
| | | | 702/6 |
| 2014/0039836 A1* | 2/2014 | Moricca | F04D 15/00 |
| | | | 702/184 |
| 2014/0039859 A1* | 2/2014 | Maucec | E21B 43/00 |
| | | | 703/10 |
| 2014/0114577 A1* | 4/2014 | LopezGarcia | E21B 49/087 |
| | | | 702/13 |
| 2015/0051892 A1* | 2/2015 | Carvajal | G01V 99/005 |
| | | | 703/10 |
| 2016/0131801 A1* | 5/2016 | Singh | G01V 99/005 |
| | | | 702/6 |

* cited by examiner

Before History Matching

After History Matching

Change in Permeability

404

HYBRID APPROACH TO ASSISTED HISTORY MATCHING IN LARGE RESERVOIRS

CROSS-REFERENCE TO RELATED APPLICATIONS

This Application claims priority from PCT Patent Application Ser. No. PCT/US13/55463, filed on Aug. 16, 2013, which claims priority from U.S. Provisional Patent Application Ser. No. 61/843,108, filed on Jul. 5, 2013, which are incorporated herein by reference. This Applications and U.S. Patent Application Serial No. PCT/US13/52550, which is incorporated by reference, are commonly assigned to Landmark Graphics Corporation.

STATEMENT REGARDING FEDERALLY SPONSORED RESEARCH

Not applicable.

FIELD OF THE DISCLOSURE

The present disclosure generally relates to systems and methods for a hybrid approach to assisted history matching in large reservoirs. More particularly, the present disclosure relates to a hybrid approach to assisted history matching in large reservoirs based on a reservoir model built using connectivity between each production well and each corresponding injection well, aquifer or gas cap.

BACKGROUND

In the history matching process, the reservoir model is adjusted by manipulating the physical properties attributed to grid-cells representing the reservoir model such as porosity, permeability, relative permeability, net-to-gross (NTG), and skin factors to manually match actual production data (e.g. oil, water, gas flow rate and bottom hole pressure (BHP)). In practice there are mainly two techniques to modify manipulate the physical properties of the grid-cells: 1) identify multipliers to history match, which may result in significant deviation from the geomodel, but convergence would be fast; or 2) generate new realizations of the physical property using the geomodel, which are constrained by streamline-based sensitivities. The latter technique is rigorous because it generates a history match that honors geomodeling constraints but, at the same time, convergence can be slow.

Manual history matching is often used for coarse reservoir models with only a few hundred thousand grid-cells and a few production wells. For larger reservoir models with dozens of production wells, however, manual history matching is extremely time consuming. Because manual history matching involves a trial and error approach, it often results in a match based on unrealistic geological features. To prevent a match based on such features as the reservoir model size increases, various assisted history matching (AHM) techniques have been identified. Many of the AHM techniques, however, do not integrate interaction between the geomodel and the reservoir model during the history matching process. For example, once the geomodel is built, properties around the production wells and the injection wells are modified in a sequential manner (e.g. by using multipliers to change reservoir properties by factors). AHM techniques therefore, do not guarantee that the reservoir model honors all realistic geomodeling constraints, namely variograms and well logs (e.g. permeability and facies).

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

Figure 1:
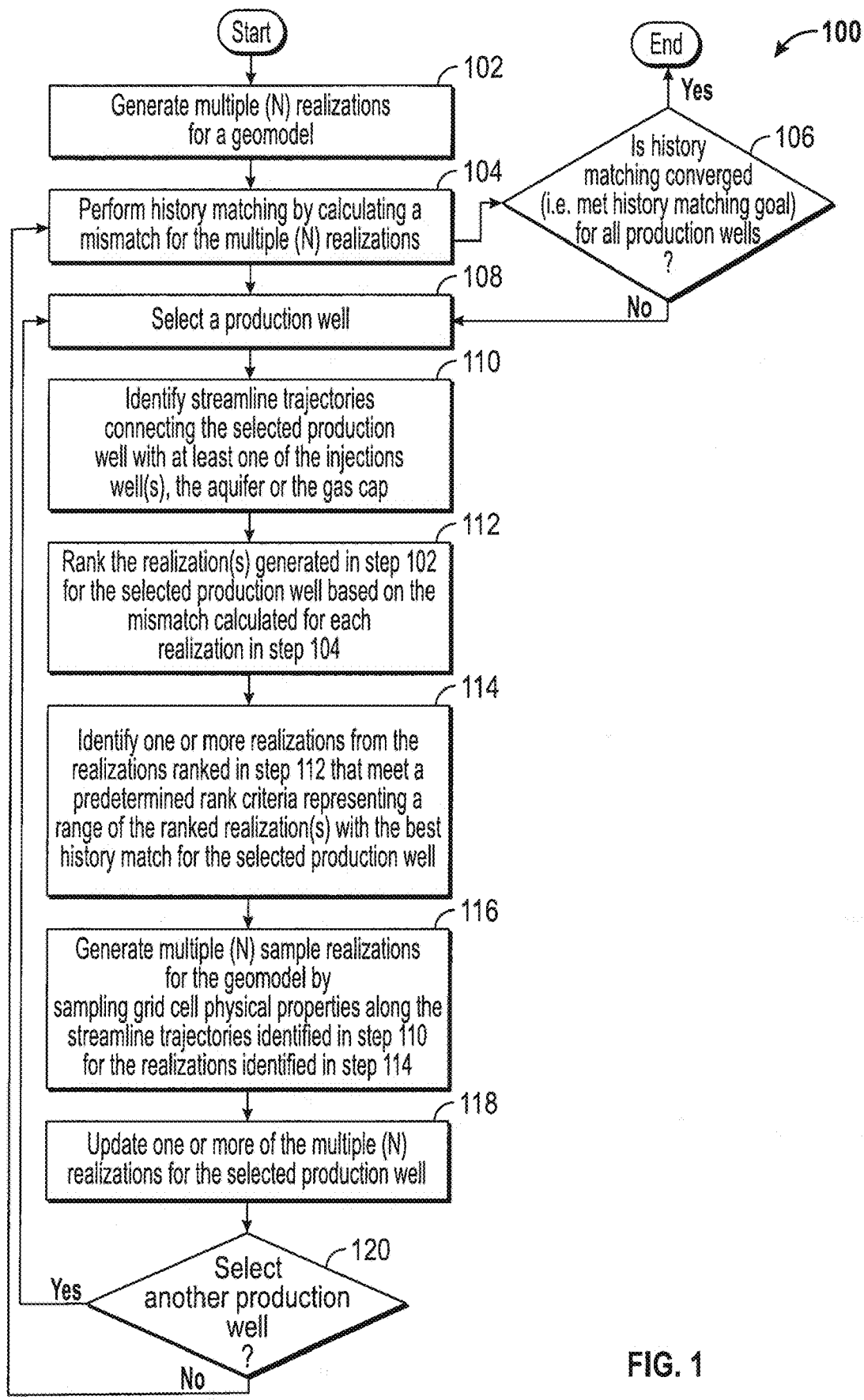
FIG. 1 is a flow diagram illustrating one embodiment of a method for implementing the present disclosure.

The present disclosure therefore, overcomes one or more deficiencies in the prior art by providing systems and methods for a hybrid approach to assisted history matching in large reservoirs based on a reservoir model built using connectivity between each production well and each corresponding injection well.

In one embodiment, the present disclosure includes a method for hybrid assisted history matching, which comprises: a) performing history matching by calculating a mismatch for multiple realizations of a geomodel representing a reservoir; b) selecting a production well from a group of production wells in the reservoir; c) generating one or more sample realizations for the geomodel by sampling one or more grid-cell physical properties along one or more streamline trajectories from one or more of the multiple realizations of the geomodel that meet a predetermined rank criteria, the one or more streamline trajectories connecting the selected production well with at least one of an injection well, an aquifer and a gas cap; d) updating one or more of the multiple realizations for the selected production well using the one or more sample realizations and a computer system; and e) repeating steps a)-d) for each production well in the group of production wells.

In another embodiment, the present disclosure includes a non-transitory program carrier device tangibly carrying computer executable instructions for hybrid assisted history matching, the instructions being executable to implement: a) performing history matching by calculating a mismatch for multiple realizations of a geomodel representing a reservoir; b) selecting a production well from a group of production wells in the reservoir; c) generating one or more sample realizations for the geomodel by sampling one or more grid-cell physical properties along one or more streamline trajectories from one or more of the multiple realizations of the geomodel that meet a predetermined rank criteria, the one or more streamline trajectories connecting the selected production well with at least one of an injection well, an aquifer and a gas cap; d) updating one or more of the multiple realizations for the selected production well using the one or more sample realizations; and e) repeating steps a)-d) for each production well in the group of production wells.

In yet another embodiment, the present disclosure includes a non-transitory program carrier device tangibly carrying computer executable instructions for hybrid assisted history matching, the instructions being executable to implement: a) performing history matching by calculating a mismatch for multiple realizations of a geomodel representing a reservoir; b) selecting a production well from a group of production wells in the reservoir; c) generating one or more sample realizations for the geomodel by sampling one or more grid-cell physical properties along one or more streamline trajectories from one or more of the multiple realizations of the geomodel that meet a predetermined rank criteria, the one or more streamline trajectories connecting the selected production well with an injection well; d) updating one or more of the multiple realizations for the selected production well using the one or more sample realizations; e) repeating steps a)-d) for each production well in the group of production wells; and f) repeating at least one of steps a) and b)-e) until each production well in the group of production wells has met a history matching goal.

The subject matter of the present disclosure is described with specificity, however, the description itself is not intended to limit the scope of the disclosure. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries to achieve similar results.

Method Description

Referring now to FIG. 1, a flow diagram of one embodiment of a method 100 for implementing the present disclosure is illustrated. The method 100 presents a hybrid approach to assisted history matching.

In step 102, multiple (N) realizations are generated for a geomodel using techniques well known in the art for generating a geomodel. A realization represents a model of a reservoir's physical property and an actual well log represents the measured physical property of the reservoir.

Figure 2A:
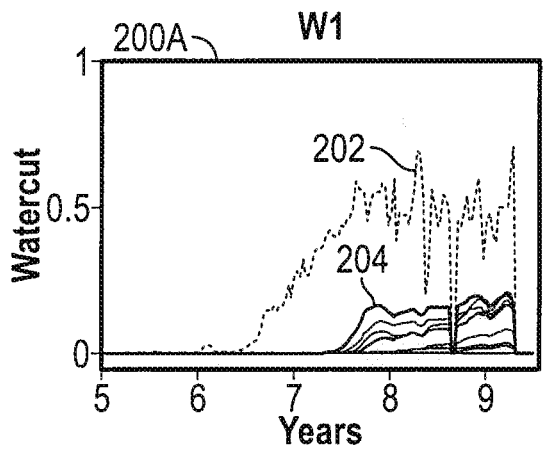
FIGS. 2A-2E are graphical displays illustrating a comparison between watercut profiles for ten reservoir model realizations and actual watercut profiles for a production well (W1) over five iterations of step 104 in FIG. 1.
Figure 2B:
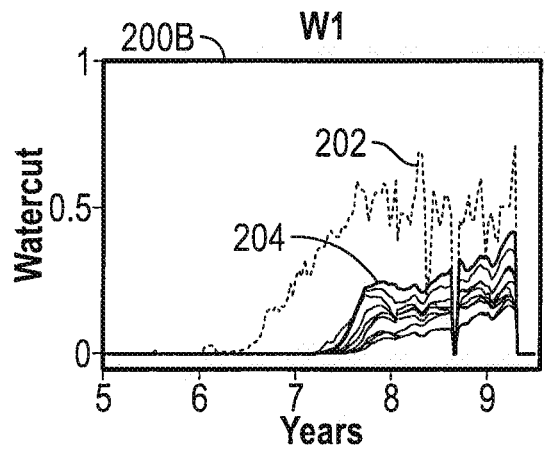
Figure 2C:
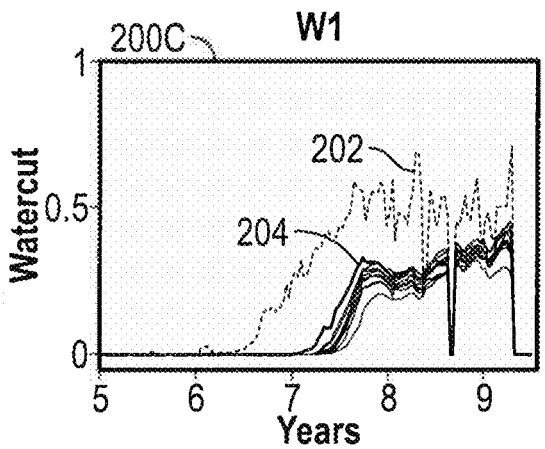
Figure 2D:
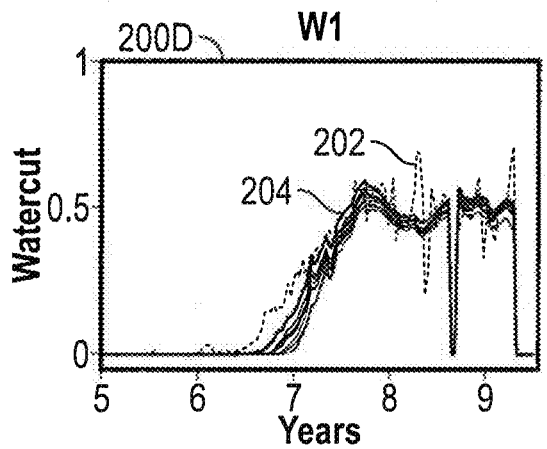
Figure 2E:
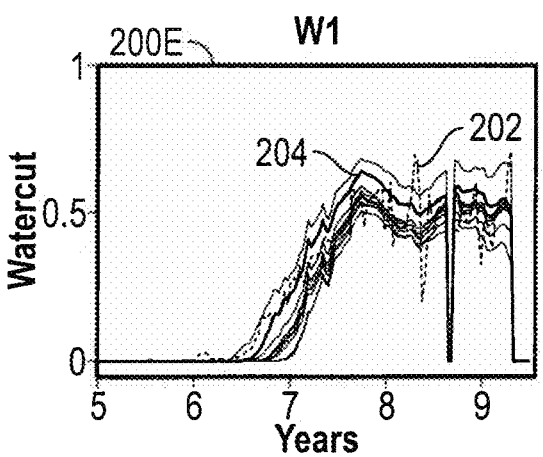

In step 104, history matching is performed by calculating a mismatch for the multiple (N) realizations. The mismatch is calculated by comparing actual production data and simulated production data using reservoir simulation models that are based on the multiple (N) realizations. In FIGS. 2A-2E, graphical displays 200A-200E illustrate an example of visualizing a mismatch by a comparison between watercut profiles for ten reservoir model realizations and actual watercut profiles for a production well (W1) over five iterations of the step 104. Line 202 represents the actual watercut profiles and line 204 represents the reservoir model realization that is the basis of the best history match. The rest of the lines represent the watercut profiles for the ten reservoir model realizations. In FIG. 2E, the graphical display 200E illustrates that the watercut profiles for the ten reservoir model realizations are very close to the actual watercut profiles after the fifth iteration of step 104. Depending on the source of reservoir energy (active aquifer or large gas cap) and the type of injection well (water or gas), the actual production data for history matching will either be watercut profiles or gas oil ratio profiles from oil, water and gas production. In both cases, two types of connections are required for history matching, namely connectivity between the production well and i) the injection well(s) or ii) an aquifer or gas cap.

In step 106, the method 100 determines if the history matching performed in step 104 is converged for all production wells based on a predetermined history matching goal. If the history matching is converged, then the method 100 ends. If the history matching is not converged, then the method 100 proceeds to step 108. In FIG. 2A, for example, history matching is not converged because the history matching goal requires a smaller variation between the watercut profiles for the ten reservoir model realizations and the actual watercut profiles for the production well.

Figure 7:
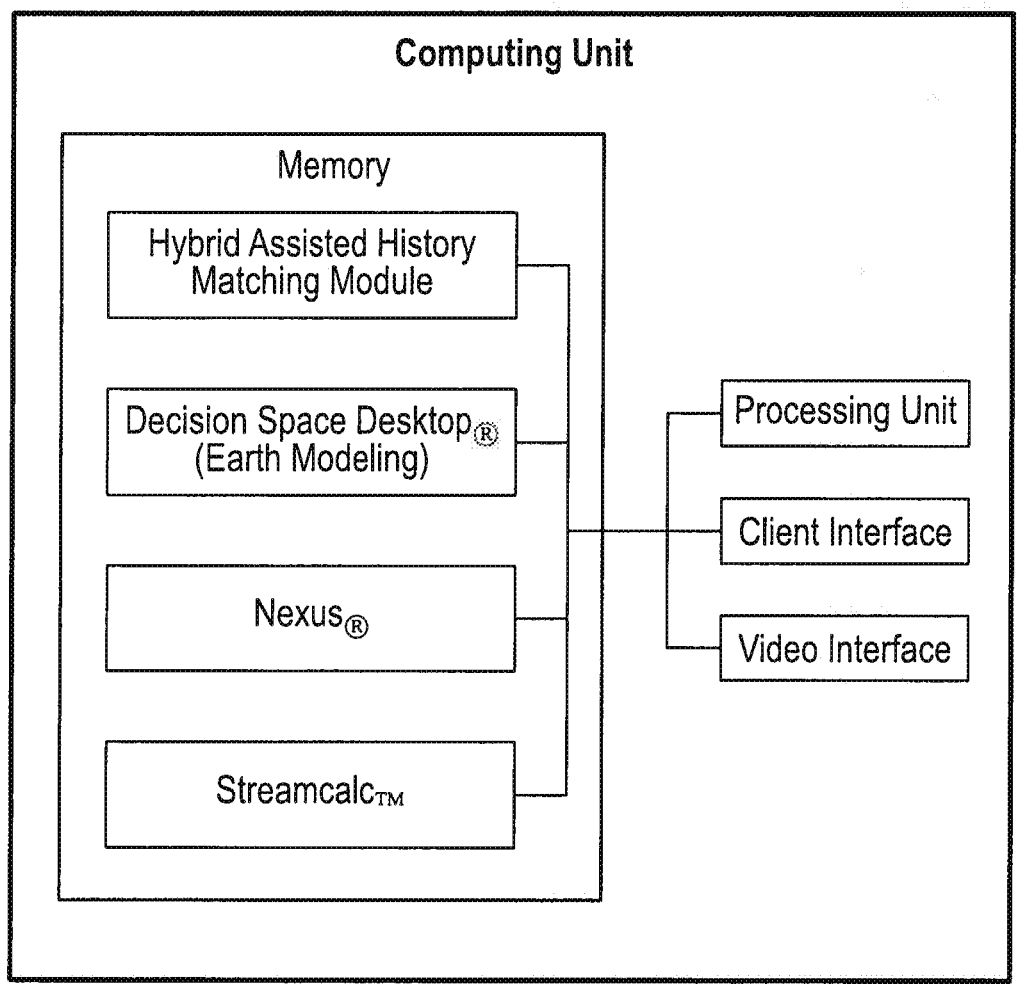
FIG. 7 is a block diagram illustrating one embodiment of a computer system for implementing the present disclosures.

In step 108, a production well that is automatically selected from the group of all production wells or it may be manually selected using the client interface and/or the video interface described further in reference to FIG. 7.

Figure 3:
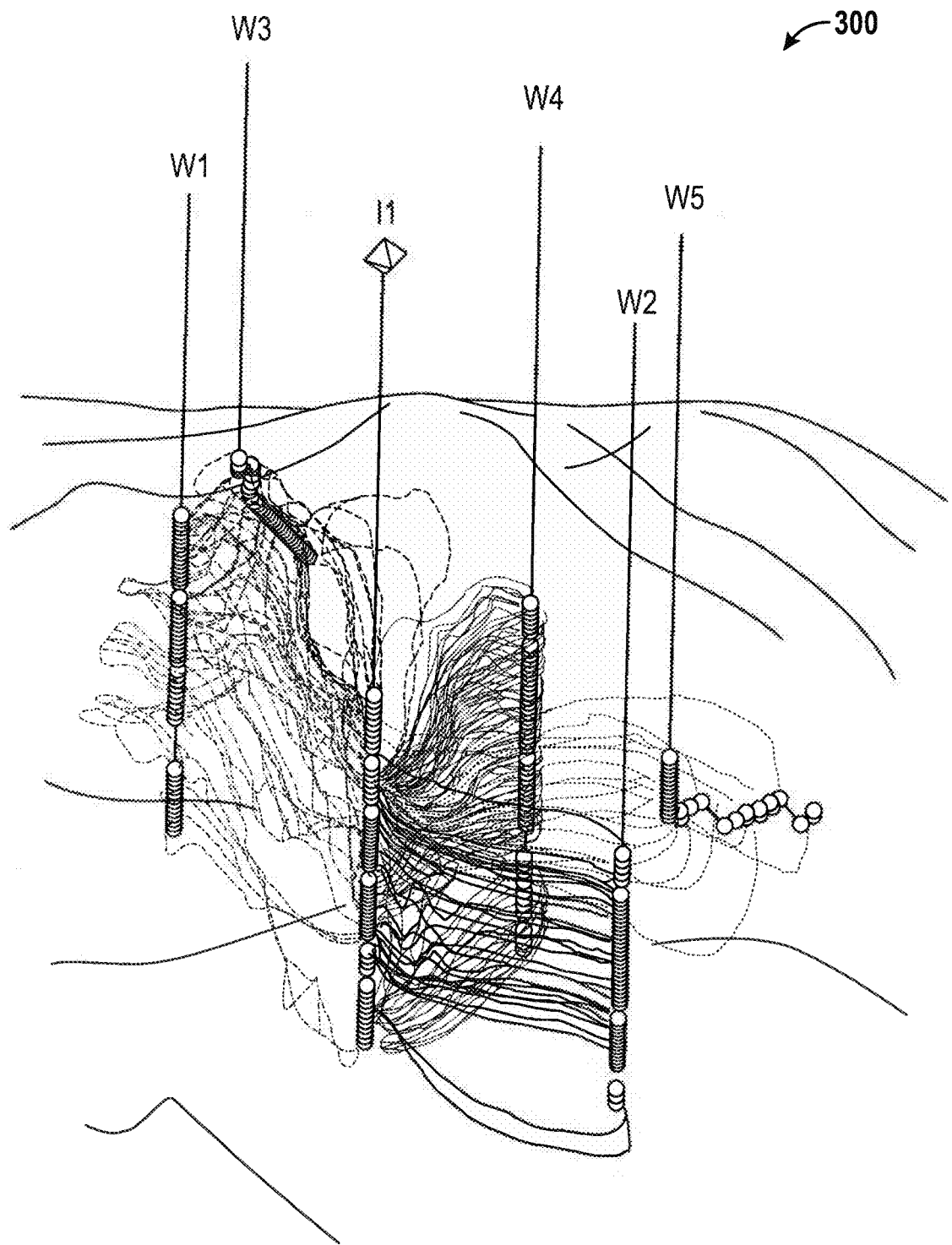
FIG. 3 is a three-dimensional display illustrating streamline trajectories connecting production wells (W1-W5) with an injection well (I1) as a result of the identification in step 110 of FIG. 1.
Figure 4:
FIG. 4 is a two-dimensional display illustrating a top view of the streamline trajectories in FIG. 3.
Figure 5:
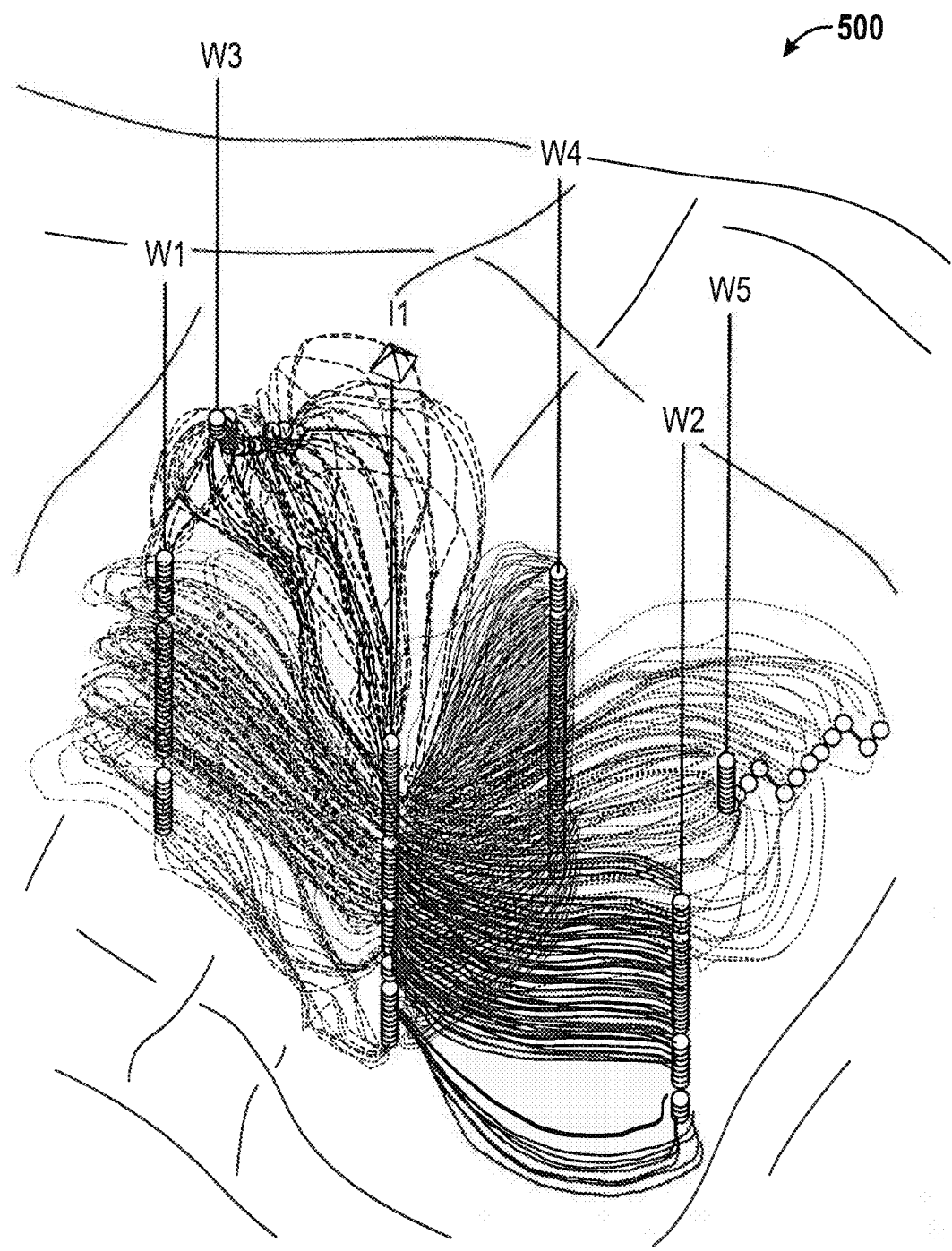
FIG. 5 is a three-dimensional display illustrating increased streamline trajectories (compared to the streamline trajectories in FIG. 3) connecting production wells (W1-W5) with an injection well (I1) after history matching is converged.

In step 110, streamline trajectories connecting the selected production well with at least one of the injection well(s), the aquifer or the gas cap are identified using streamline calculations and techniques well known in the art. In FIG. 3, a three-dimensional display 300 illustrates an example of streamline trajectories connecting production wells (W1-W5) with an injection well (I1) after five iterations of steps 108-120. In FIG. 4, a two-dimensional display 400 illustrates a top view of the streamline trajectories in FIG. 3. As the watercut is increased to match the actual production data, streamline trajectories are also increased and indicate more paths for water propagation. In FIG. 5, for example, a three-dimensional display 500 illustrates an example of increased streamline trajectories (compared to the streamline trajectories in FIG. 3) connecting production wells (W1-W5) with an injection well (I1) after five iterations of steps 104-120 (i.e. after history matching is converged) FIG. 5 reveals that streamline trajectories carry important information for fluid flow, which can be used to improve the efficiency of history matching. In other words, the rate of convergence for history matching increases due to the establishment of proper connections between each production well and each corresponding injection well. Since streamline trajectories capture the connectivity between production wells and corresponding injection wells, any physical property modification along the streamline trajectory results in a significant effect on history matching for watercut and gas oil ratio.

In step 112, the realization(s) generated in step 102 for the selected production well are ranked in ascending or descending order based on the mismatch calculated for each realization in step 104.

In step 114, one or more realizations from the realization(s) ranked in step 112 are identified that meet a predetermined rank criteria representing a range of the ranked realization(s) with the best history match for the selected production well. In this manner, a sampling database N(t) may be identified or updated by adding a range of the ranked realization(s) with the best history match for the selected production well in an existing sampling database where N(t) represents the identified realization(s) and is less than or equal to the multiple (N) realizations generated in step 102.

In step 116, multiple (N) sample realizations are generated for the geomodel by sampling grid-cell physical properties along the streamline trajectories identified in step 110 for the realizations (N(t)) identified in step 114.

In step 118, one or more of the multiple (N) realizations for the selected production well are updated using the one or more sample realizations from step 116 according to the following equation:

$$m_{i|k+1}^{s,p}=(1-\delta)m_{i|k}^{s,p}-\delta m_{sam,i|k}^{s,p} \text{ for } i=1,2\ldots N \text{ and } k=1,2\ldots K \quad (1)$$

where (m) is the reservoir property, (s) are the streamline trajectories for a given pair of production well/injection well, (i) is the model index, (k) is the iteration number, (p) is the selected production well, (sam) is the property sampled from the known distribution function/sampling dataset, incident to the realization(s) ranked in step 112, and ($0<\delta<1$), selected by the user, is the weight to sampled grid-cell physical property along the streamline trajectories identified in step 110. Thus, ($m_{i|k}^{s,p}$) is the value of property (m) of the ($i^{th}$) model along the streamline trajectories for production well (p) at the ($k^{th}$) iteration and ($m_{sam,i|k}^{s,p}$) represents the sampled property generated from the multiple (N) sample realizations in step 116. In this step, the streamline trajectories are used as a guideline to capture the fluid flow patterns and only the physical properties of grid-cells are sampled along the streamline trajectories.

In step 120, the method 100 determines if there is another production well to select from the group of all production wells. If there is another production well to select, then the method 100 returns to step 108. If there is not another production well to select, then the method 100 returns to step 104.

Figure 6A:
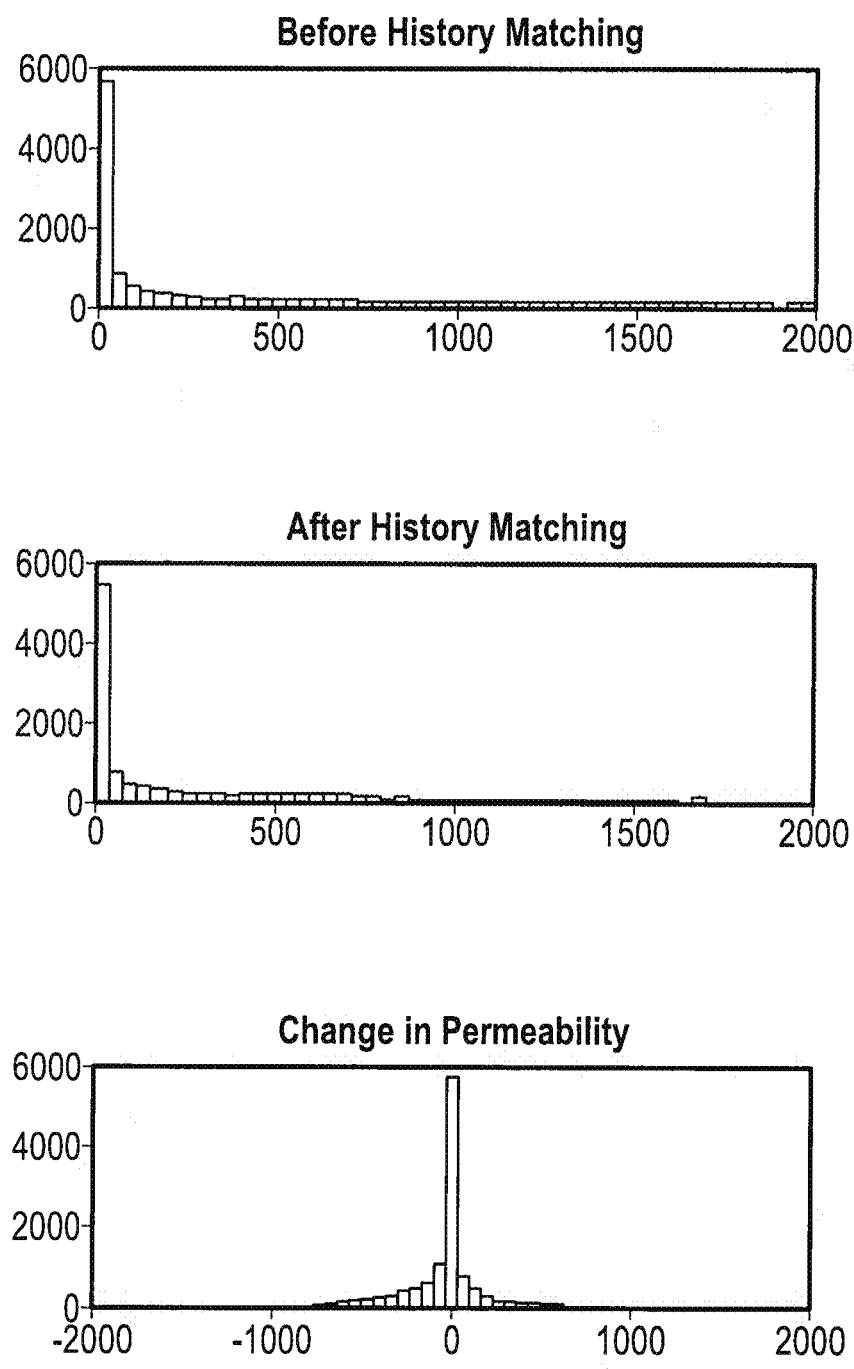
FIG. 6A are histograms illustrating a comparison of permeability distribution before and after history matching is converged for a heterogeneous layer.
Figure 6B:
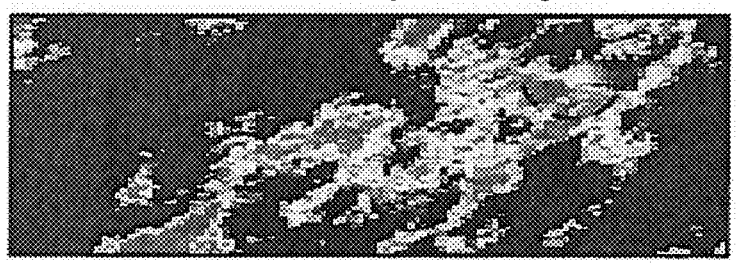
FIG. 6B are displays illustrating a comparison of spatial permeability distribution before and after history matching is converged for the same heterogeneous layer.
Figure 6B:
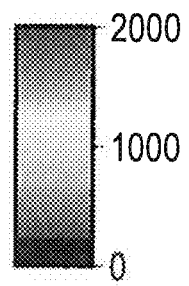
Figure 6B:
Figure 6B:
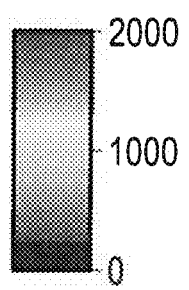
Figure 6B:
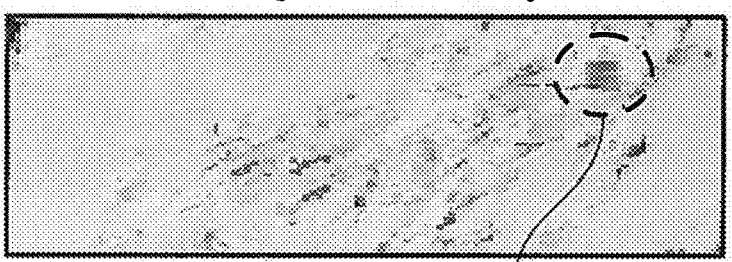
Figure 6B:
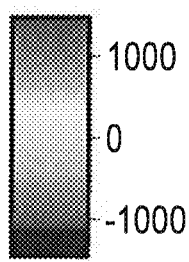

The method 100 therefore, is not purely statistically driven, however, is geologically constrained. The histograms in FIG. 6A, for example, illustrate a comparison of permeability distribution before and after history matching is converged for a heterogeneous layer. And, the displays in FIG. 6B illustrate a comparison of spatial permeability distribution before and after history matching is converged for the same heterogeneous layer. The method 100 thus, improved the permeability in the circled area 404 where the production wells W1-W5 exist. Additionally, the statics of permeability distribution almost remain the same before and after history matching as illustrated by the histograms in FIG. 6A.

The method 100 therefore, improves the initial reservoir model realization without producing any unrealistic feature such as very large values of permeability. The method 100 can be used to generate a single history matched model or an ensemble of history matched models. In addition, the method 100 can be applied to multi-level history matching techniques and may be used to enhance manual history matching.

An automatic update of the reservoir model is generated by the method 100 and the rate of history matching convergence is faster, compared to conventional AHM, for larger reservoir models with dozens of production wells by establishing direct connections between the reservoir flow simulator and the identified streamline trajectories. Moreover, the method 100 honors the well logs, core logs and variograms to produce a history match that has physical properties close to reality. Conventional AHM requires a trial and error approach to truncate unrealistically large streamline sensitivities to carry out history matching. Conversely, the method 100 does not require sensitivity calculations and thus, does not require a tedious trial and error approach to truncate unrealistically large streamline sensitivities.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software foil is an interface to allow a computer to react according to a source of input. DecisionSpace Desktop®, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multi-processor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Referring now to FIG. 7, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-6. The memory therefore, includes a hybrid assisted history matching module, which enables steps 104-120 described in reference to FIG. 1. The hybrid assisted history matching module may integrate functionality from the remaining application programs illustrated in FIG. 7. In particular, DecisionSpace Desktop® may be used as an interface application to perform step 102 in FIG. 1. In addition, Nexus® and Streamcalc™, which are commercial software applications marketed by Landmark Graphics Corporation, may also be used as interface applications to perform the reservoir simulation involved in step 104 and the streamline calculations used in step 110 of FIG. 1, respectively. Although DecisionSpace Desktop®, Nexus® and Streamcalc™ may be used as interface applications, other interface applications may be used, instead, or the hybrid assisted history matching module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method for hybrid assisted history matching, which comprises:
   a) performing history matching by calculating a mismatch for multiple realizations of a geomodel representing a reservoir;
   b) selecting a production well from a group of production wells in the reservoir;
   c) generating one or more sample realizations for the geomodel by sampling one or more grid-cell physical properties along one or more streamline trajectories from one or more of the multiple realizations of the geomodel that meet a predetermined rank criteria, the one or more streamline trajectories connecting the selected production well with at least one of an injection well, an aquifer and a gas cap;
   d) updating one or more of the multiple realizations for the selected production well using the one or more sample realizations and based on a physical property of the reservoir, the one or more streamline trajectories over a plurality of iterations, and a sample property of the reservoir generated from the plurality of iterations; and
   e) repeating steps a)-d) for each production well in the group of production wells.

2. The method of claim 1, further comprising repeating at least one of steps a) and b)-e) until each production well in the group of production wells has met a history matching goal comprising a threshold maximum variation between the updated one or more of the multiple realizations and an actual profile based at least in part on the physical property of the reservoir.

3. The method of claim 1, wherein the mismatch is calculated by comparing actual production data for the reservoir and simulated production data using reservoir simulation models that are based on the multiple realizations.

4. The method of claim 1, wherein the actual production data represents actual watercut profiles or actual gas oil ratio profiles.

5. The method of claim 1, wherein the predetermined rank criteria represents a range of the multiple realizations with a best history match for the selected production well.

6. The method of claim 1, wherein the grid-cell physical properties represent porosity, permeability, relative permeability or net-to-gross.

7. The method of claim 1, wherein the one or more of the multiple realizations for the selected production well are updated according to:

$$m_{i|k+1}^{s,p} = (1-\delta) m_{i|k}^{s,p} + m_{sam,i|k}^{s,p} \text{ for } i=1,2\ldots N \text{ and } k=1,2\ldots K$$

wherein (m) is the physical property of the reservoir; (s) are the one or more streamline trajectories; (i) is a model index; (k) is an iteration; (p) is the selected production well; (sam) represents the physical property of the reservoir sampled; and (δ) is selected between 0 and 1.

8. A non-transitory program carrier device tangibly carrying computer executable instructions for hybrid assisted history matching, the instructions being executable to implement:
   a) performing history matching by calculating a mismatch for multiple realizations of a geomodel representing a reservoir;
   b) selecting a production well from a group of production wells in the reservoir;
   c) generating one or more sample realizations for the geomodel by sampling one or more grid-cell physical properties along one or more streamline trajectories from one or more of the multiple realizations of the geomodel that meet a predetermined rank criteria, the one or more streamline trajectories connecting the selected production well with at least one of an injection well, an aquifer and a gas cap;
   d) updating one or more of the multiple realizations for the selected production well using the one or more sample realizations and based on a physical property of the reservoir, the one or more streamline trajectories over a plurality of iterations, and a sample property of the reservoir generated from the plurality of iterations; and
   e) repeating steps a)-d) for each production well in the group of production wells.

9. The program carrier device of claim 8, further comprising repeating at least one of steps a) and b)-e) until each production well in the group of production wells has met a history matching goal comprising a threshold maximum variation between the updated one or more of the multiple realizations and an actual profile based at least in part on the physical property of the reservoir.

10. The program carrier device of claim 8, wherein the mismatch is calculated by comparing actual production data for the reservoir and simulated production data using reservoir simulation models that are based on the multiple realizations.

11. The program carrier device of claim 8, wherein the actual production data represents actual watercut profiles or actual gas oil ratio profiles.

12. The program carrier device of claim 8, wherein the predetermined rank criteria represents a range of the multiple realizations with a best history match for the selected production well.

13. The program carrier device of claim 8, wherein the grid-cell physical properties represent porosity, permeability, relative permeability or net-to-gross.

14. The program carrier device of claim 8, wherein the one or more of the multiple realizations for the selected production well are updated according to:

$$m_{i|k+1}^{s,p} = (1-\delta)m_{i|k}^{s,p} + m_{sam,i|k}^{s,p} \text{ for } i=1,2\ldots N \text{ and } k=1,2\ldots K$$

wherein (m) is the physical property of the reservoir; (s) are the one or more streamline trajectories; (i) is a model index; (k) is an iteration number; (p) is the selected production well; (sam) represents the physical property of the reservoir sampled; and (δ) is selected between 0 and 1.

15. A non-transitory program carrier device tangibly carrying computer executable instructions for hybrid assisted history matching, the instructions being executable to implement:
   a) performing history matching by calculating a mismatch for multiple realizations of a geomodel representing a reservoir;
   b) selecting a production well from a group of production wells in the reservoir;
   c) generating one or more sample realizations for the geomodel by sampling one or more grid-cell physical properties along one or more streamline trajectories from one or more of the multiple realizations of the geomodel that meet a predetermined rank criteria, the one or more streamline trajectories connecting the selected production well with at least one of an injection well, an aquifer and a gas cap;
   d) updating one or more of the multiple realizations for the selected production well using the one or more sample realizations and based on a physical property of the reservoir, the one or more streamline trajectories over a plurality of iterations, and a sample property of the reservoir generated from the plurality of iterations;
   e) repeating steps a)-d) for each production well in the group of production wells; and
   f) repeating at least one of steps a) and b)-c) until each production well in the group of production wells has met a history matching goal comprising a threshold maximum variation between the updated one or more of the multiple realizations and an actual profile based at least in part on the physical property of the reservoir.

16. The program carrier device of claim 15, wherein the mismatch is calculated by comparing actual production data for the reservoir and simulated production data using reservoir simulation models that are based on the multiple realizations.

17. The program carrier device of claim 15, wherein the actual production data represents actual watercut profiles or actual gas oil ratio profiles.

18. The program carrier device of claim 15, wherein the predetermined rank criteria represents a range of the multiple realizations with a best history match for the selected production well.

19. The program carrier device of claim 15, wherein the grid-cell physical properties represent porosity, permeability, relative permeability or net-to-gross.

20. The program carrier device of claim 15, wherein the one or more of the multiple realizations for the selected production well are updated according to:

$$m_{i|k+1}^{s,p} = (1-\delta)m_{i|k}^{s,p} + m_{sam,i|k}^{s,p} \text{ for } i=1,2\ldots N \text{ and } k=1,2\ldots K$$

wherein (m) is the physical property of the reservoir; (s) are the one or more streamline trajectories; (i) is a model index; (k) is an iteration number; (p) is the selected production well; (sam) represents the physical property of the reservoir sampled; and (δ) is selected between 0 and 1.

* * * * *